(12) United States Patent
Wang et al.

(10) Patent No.: US 10,380,427 B2
(45) Date of Patent: Aug. 13, 2019

(54) PARTNER MATCHING METHOD IN COSTARRING VIDEO, TERMINAL, AND COMPUTER READABLE STORAGE MEDIUM

(71) Applicant: Tencent Technology (Shenzhen) Company Limited, Shenzhen (CN)

(72) Inventors: Qianyi Wang, Shenzhen (CN); Yanggang Dai, Shenzhen (CN); Feng Shi, Shenzhen (CN); Faqiang Wu, Shenzhen (CN); Lingrui Cui, Shenzhen (CN); Tao Xiong, Shenzhen (CN); Yu Gao, Shenzhen (CN); Yunsheng Wu, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 16/107,704

(22) Filed: Aug. 21, 2018

(65) Prior Publication Data

US 2018/0357485 A1 Dec. 13, 2018

Related U.S. Application Data

(63) Continuation-in-part of application No. PCT/CN2017/074301, filed on Feb. 21, 2017.

(30) Foreign Application Priority Data

Mar. 14, 2016 (CN) .......................... 2016 1 0143349

(51) Int. Cl.
*G06K 9/00* (2006.01)
*G06K 9/62* (2006.01)
(Continued)

(52) U.S. Cl.
CPC ......... *G06K 9/00718* (2013.01); *G06F 16/00* (2019.01); *G06F 16/7867* (2019.01); *G06K 9/623* (2013.01); *G11B 27/036* (2013.01)

(58) Field of Classification Search
CPC ... G11B 27/19; G11B 27/34; G11B 20/00007; G11B 27/031; G11B 2020/00072;
(Continued)

(56) References Cited

U.S. PATENT DOCUMENTS

2008/0215984 A1* 9/2008 Manico ................ G11B 27/031
715/730
2010/0070483 A1* 3/2010 Delgo .................. G11B 27/034
707/706
(Continued)

FOREIGN PATENT DOCUMENTS

CN 1647526 A 7/2005
CN 1742482 A 3/2006
(Continued)

OTHER PUBLICATIONS

Tencent Technology, ISRWO, PCT/CN2017/074301, May 3, 2017, 6 pgs.
Tencent Technology, IPRP, PCT/CN2017/074301, Sep. 18, 2018, 5 pgs.

*Primary Examiner* — Thai Q Tran
*Assistant Examiner* — Sunghyoun Park
(74) *Attorney, Agent, or Firm* — Morgan, Lewis & Bockius LLP (57) ABSTRACT

A partner matching method in a costarring video is performed by a terminal. The terminal obtains a video recorded by a first user identifier and a video in which a second role that matches the first role is played and an associated second user identifier. After obtaining a total score of videos in which the second role is played by each second user identifier in each user type, the terminal ranks the videos in
(Continued)

which the second role is played by the second user identifiers for each user type and displays a ranking result of the videos in which the second role is played for each user type. After obtaining a video selected from the ranking result, the terminal synthesizes a complete video from the selected video in which the second role is played and the video in which the first role is played.

20 Claims, 5 Drawing Sheets (51) Int. Cl.
*G11B 27/036* (2006.01)
*G06F 16/78* (2019.01)
*G06F 16/00* (2019.01)

(58) Field of Classification Search
CPC .. G11B 27/036; H04N 21/43; G06K 9/00718; G06K 9/623; G06F 16/7867; G06F 16/00
See application file for complete search history.

(56) References Cited

U.S. PATENT DOCUMENTS

| | | | |
|---|---|---|---|
| 2011/0022549 A1* | 1/2011 | Zhuang | G06F 16/00 706/12 |
| 2012/0158687 A1* | 6/2012 | Fang | G06N 5/02 707/706 |
| 2012/0311448 A1* | 12/2012 | Achour | G06Q 10/101 715/723 |
| 2016/0004778 A1* | 1/2016 | Finder | G06F 16/9535 707/722 |

FOREIGN PATENT DOCUMENTS

| | | |
|---|---|---|
| CN | 101801483 A | 8/2010 |
| CN | 102855708 A | 1/2013 |
| CN | 103389996 A | 11/2013 |
| CN | 105049325 A | 11/2015 |
| CN | 105787087 A | 7/2016 |
| JP | 2013073324 A | 4/2013 |
| KR | 20120119244 A | 10/2012 |
| KR | 20130002090 A | 1/2013 |

* cited by examiner

PARTNER MATCHING METHOD IN COSTARRING VIDEO, TERMINAL, AND COMPUTER READABLE STORAGE MEDIUM

PRIORITY CLAIM AND RELATED APPLICATION

This application is a continuation-in-part application of PCT/CN2017/074301, entitled "PARTNER MATCHING METHOD IN COSTARRING VIDEO, TERMINAL, AND COMPUTER READABLE STORAGE MEDIUM" filed on Feb. 21, 2017, which claims priority to Chinese Patent Application No. 201610143349.X, filed with the State Intellectual Property Office of the People's Republic of China on Mar. 14, 2016, and entitled "PARTNER MATCHING METHOD IN COSTARRING VIDEO, TERMINAL, AND COMPUTER READABLE STORAGE MEDIUM", all of which are incorporated herein by reference in their entirety.

FIELD OF THE TECHNOLOGY

The present disclosure relates to the field of computer application, and in particular, to a partner matching method in a costarring video, a terminal, and a computer readable storage medium.

BACKGROUND OF THE DISCLOSURE

With the development of network technologies, there is an increasing quantity of users participating in various social activities by using networks. To enrich lives, some users record, by using a recording device, a video in which they play a role, upload the recorded video to a network, wait for another user to record a video of a partner role, and synthesize a costarring video from the video of the self-played role and the video of the partner role.

However, in the conventional manner, a role in a video played by a user himself is recorded first, and a remaining role in the video is filled with a piece of still picture or an animation, waiting to be played by someone actively. The efficiency of costarring is greatly reduced when the waiting time is excessively long.

SUMMARY

According to various embodiments of this application, a partner matching method in a costarring video, a terminal, and a computer readable storage medium are provided.

A partner matching method in a costarring video is performed by a terminal having one or more processors and memory storing a plurality of programs to be executed by the one or more processors. The terminal first obtains a video recorded by a first user identifier and a video in which a second role that matches the first role is played and an associated second user identifier. After obtaining a total score of videos in which the second role is played by each second user identifier in each user type, the terminal ranks the videos in which the second role is played by the second user identifiers for each user type and displays a ranking result of the videos in which the second role is played for each user type. After obtaining a video selected from the ranking result, the terminal synthesizes a complete video from the selected video in which the second role is played and the video in which the first role is played.

A terminal includes a memory and a processor, the memory storing computer readable instructions, and the instructions, when executed by the processor, causing the processor to perform the aforementioned method for partner matching in a costarring video.

A non-transitory computer readable storage media including computer executable instructions, the computer executable instructions, when executed by one or more processors of a terminal, causing the terminal to perform the aforementioned method for partner matching in a costarring video.

Details of one or more embodiments of the present invention are provided in the following accompanying drawings and descriptions. Other features, objectives, and advantages of the present disclosure become clear in the specification, the accompanying drawings, and the claims.

BRIEF DESCRIPTION OF THE DRAWINGS

To describe the technical solutions in the embodiments of the present invention or in the existing technology more clearly, the following briefly describes the accompanying drawings required for describing the embodiments or the existing technology. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used for explaining the present disclosure but are not intended to limit the present disclosure.

It may be understood that the terms such as "first" and "second" used in the present disclosure can be used for describing various elements in the specification. However, the elements are not limited by the terms. The terms are merely used for distinguishing a first element from another element. For example, a first client may be referred to as a second client without departing from the scope of the present disclosure. Similarly, a second client may be referred to as a first client. Both the first client and the second client are clients, but are not a same client.

Figure 1:
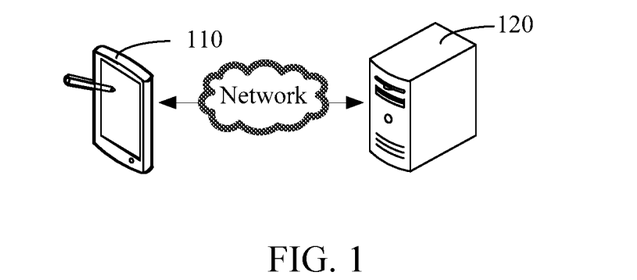
FIG. 1 is a schematic diagram of an application environment of a partner matching method in a costarring video according to some embodiments of the present disclosure.

FIG. 1 is a schematic diagram of an application environment of a partner matching method in a costarring video according to some embodiments of the present disclosure. As shown in FIG. 1, the application environment includes a terminal 110 and a server 120. The terminal 110 is in data communication with the server 120 by using a network. After obtaining a video recorded by a first user identifier and in which a first role is played by the first user, the terminal 110 uploads the video to the server 120. The server 120 obtains a video in which a second role that matches the first role is played, respectively demonstrates a video in which the second role is played for each user type, and synthesizes, according to a selected video in which the second role is played, a complete video from the selected video in which the second role is played and the video in which the first role is played.

Figure 2:
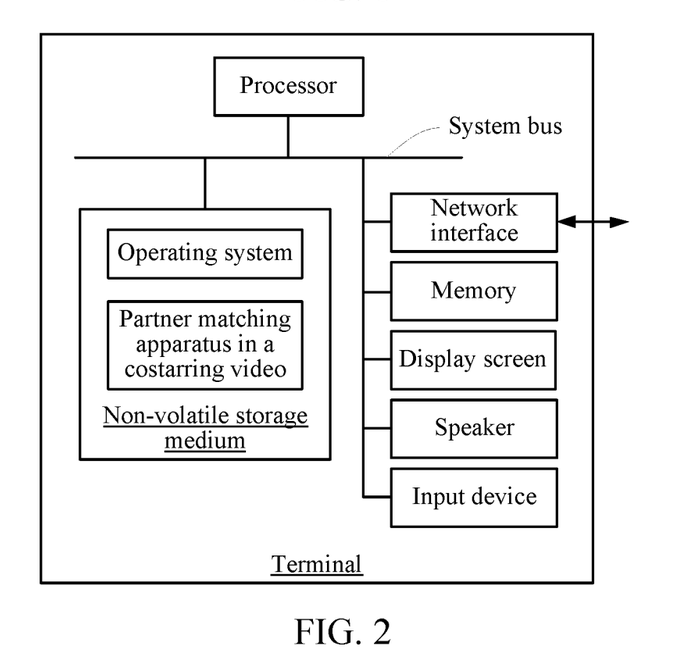
FIG. 2 is a schematic diagram of an internal structure of a terminal according to some embodiments of the present disclosure.

FIG. 2 is a schematic diagram of an internal structure of a terminal according to some embodiments of the present disclosure. As shown in FIG. 2, the terminal includes: a processor, a non-volatile storage medium, a memory, a network interface, a voice collecting device, a display screen, a speaker, and an input device that are connected by using a system bus. The non-volatile storage medium in the terminal stores an operating system, and further includes a partner matching apparatus in a costarring video. The processor is configured to provide computing and control capabilities, to support running of the entire terminal. In addition, the processor is configured to perform a procedure of a partner matching method in a costarring video. The network interface is configured to perform network communication with the server, for example, send a request of obtaining a video in which a second role is played to the server or receive a video returned by the server. The display screen of the terminal may be a liquid crystal display screen, an e-ink display screen, or the like. The input device may be a touch layer covering the display screen, or may be a key, a track ball, or a touchpad disposed on a housing of the terminal, or may be an external keyboard, touchpad, mouse, or the like. The terminal may be a mobile phone, a tablet computer, or a personal digital assistant. A person skilled in the art may understand that, in the structure shown in FIG. 2, only a block diagram of a partial structure related to a solution in this application is shown, and does not constitute a limit to the terminal to which the solution in this application is applied. Specifically, the terminal may include more components or fewer components than those shown in the figure, or some components may be combined, or a different component deployment may be used.

Figure 3:
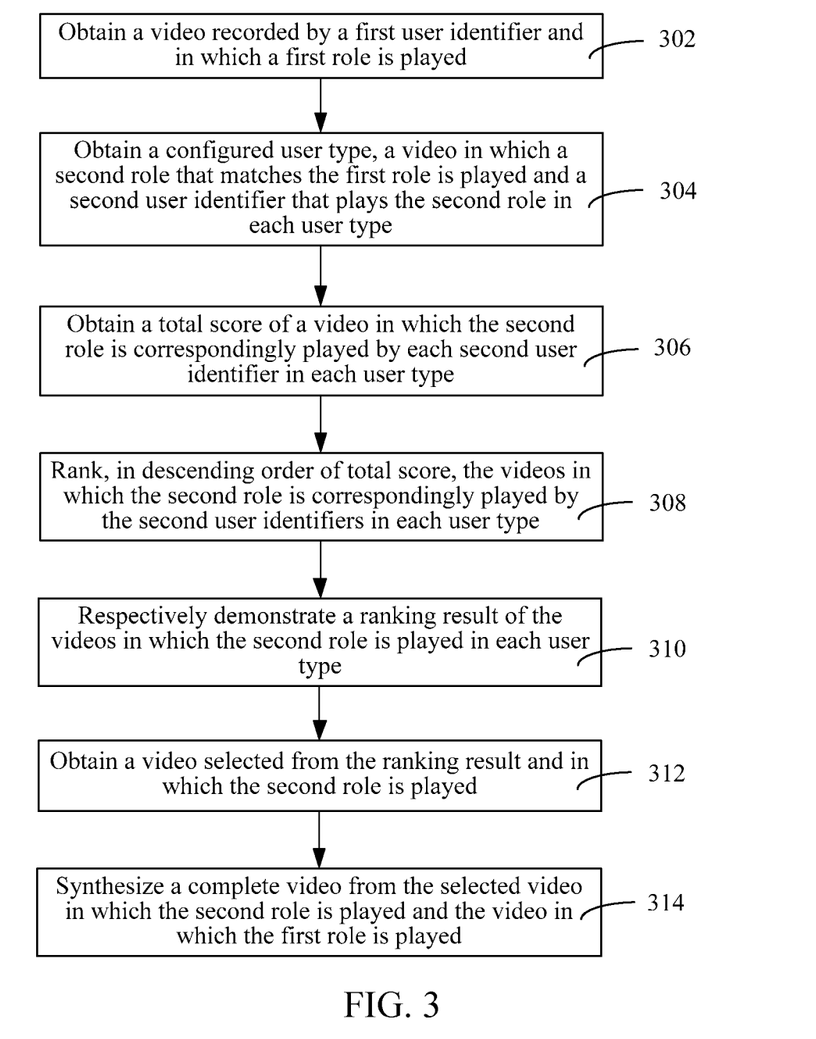
FIG. 3 is a flowchart of a partner matching method in a costarring video according to some embodiments of the present disclosure.

FIG. 3 is a flowchart of a partner matching method in a costarring video according to some embodiments of the present disclosure. As shown in FIG. 3, the partner matching method in a costarring video includes the following steps:

Step 302: Obtain a video recorded by a first user identifier and in which a first role is played by the first user.

In this embodiment, the first user identifier is used for uniquely representing an identity of a user in a video in which the first role is being played by the user. The first user identifier may be a character string, or the like. The character string may be one or more combinations of numbers, letters or characters, such as adc or adc123. The first user identifier may alternatively be a mobile number, an instant communication number, an e-mailbox, or the like. A video recorded by a first user by using a device such as a camera and in which the first role is played by the first user is obtained.

Step 304: Obtain a configured user type, a video in which a second role that matches the first role is played and a second user identifier that plays the second role in each user type.

In this embodiment, the user type may be configured according to a requirement. The user type may include a first user type, a second user type, a third user type, a fourth user type, a fifth user type, and the like, and is not limited thereto.

For example the user type may include a star, a friend of a user, a person followed by a user, an expert, a common user, or the like. A star is a person with a particular identity. A friend of a user is an instant communication friend or mobile contact friend, or the like. A person followed by a user is a person followed by the user in a social application program. An expert is a specialist or an outstanding person in a field. A common user is a user except a star, a friend of a user, a person followed by a user, and an expert.

When a user type is obtained, a user list corresponding to the user type is obtained. In a user list of each user type, all user identifiers in the user type and videos in which the user identifiers play a role are recorded. A video in which the second role is played and a second user identifier are found in the user list.

A video in which the second role is played and a second user identifier in each user type are obtained. The second user identifier is used for representing an identity of a user that plays the second role. The second user identifier may be a character string, or the like. The character string may be one or more combinations of numbers, letters or characters, such as adc or adc123. The second user identifier may alternatively be a mobile number, an instant communication number, an e-mailbox, or the like. For example, a video in which the second role is played by a star and a user identifier of the star that plays the role are obtained; a video in which the second role is played by a friend of a user and an identifier of the friend that is of the user and that plays the role are obtained; a video in which the second role is played by a person followed by a user and an identifier of the person followed by the user and playing the role are obtained; a video in which the second role is played by an expert and an identifier of the expert that plays the role are obtained; a video in which the second role is played by a common user and an identifier of the common user that plays the role are obtained.

All identifiers of users that play the second role are a second user identifier.

Step 306: Obtain a total score of videos in which the second role is correspondingly played by each second user identifier for each user type.

In this embodiment, because one user type may include videos in which the second role is correspondingly played by one or more second user identifiers, a score of a video in which the second role is correspondingly played by each second user identifier is evaluated, to obtain a total score of the video in which the second role is correspondingly played by the second user identifier.

For example, the user type is a star. Both a star A and a star B play the second role. A video in which the second role is played by the star A and a video in which the second role is played by the star B are obtained, and a total score of the video in which the second role is played by the star A and a total score of the video in which the second role is played by the star B are evaluated.

Step 308: Rank, in descending order of total score, the videos in which the second role is correspondingly played by the second user identifiers for each user type.

In this embodiment, in each user type, the videos in which the second role is played are ranked in descending order of total score, that is, the videos in which the second role is played are ranked for each independent user type, and are not mixed with other user types. For example, a video in which the second role is played in the star type is not comparatively ranked with a video in which the second role is played in the user-friend type. In addition, the videos in which the second role is played for each user type may be ranked in ascending order of total score.

Certainly, it may be understood that, in another embodiment, all videos in which the second role is played in all user types may be ranked in descending order or in ascending order of total score.

Step 310: Respectively demonstrate a ranking result of the videos in which the second role is played for each user type.

In this embodiment, a ranking result of the videos in which the second role is played is demonstrated for each user type according to the user types. For example, when the user type is a star, a ranking result of videos in which the second role is played in the star type is demonstrated in the star type; when the user type is a friend of a user, a ranking result of videos in which the second role is played in the user-friend type is demonstrated in the user-friend type.

Step 312: Obtain a video selected from the ranking result and in which the second role is played.

In this embodiment, the video selected from the ranking result and in which the second role is played may be selected by the first user himself or by a system by default.

Step 314: Synthesize a complete video from the selected video in which the second role is played and the video in which the first role is played.

In this embodiment, the synthesizing a complete video from the video in which the first role is played and the video in which the second role is played is generally dividing the video in which the first role is played into multiple segments and dividing the video in which the second role is played into multiple segments, and alternately combining the multiple segments of the video in which the first role is played with the multiple segments of the video in which the second role is played, to form a complete video.

According to the foregoing partner matching method in a costarring video, the videos in which the second role that matches the first role is played for each user type are obtained, the videos are ranked according to the total scores, the ranking result is demonstrated, the video selected from the ranking result and in which the second role is played is obtained, and the complete video is synthesized from the video in which the first role is played and the video in which the second role is played. In this way, the video in which the second role is played is automatically obtained by matching according to the video in which the first role is played, and there is no need to wait for a user to actively play the second role, so that the efficiency of video synthesis is improved.

Figure 4:
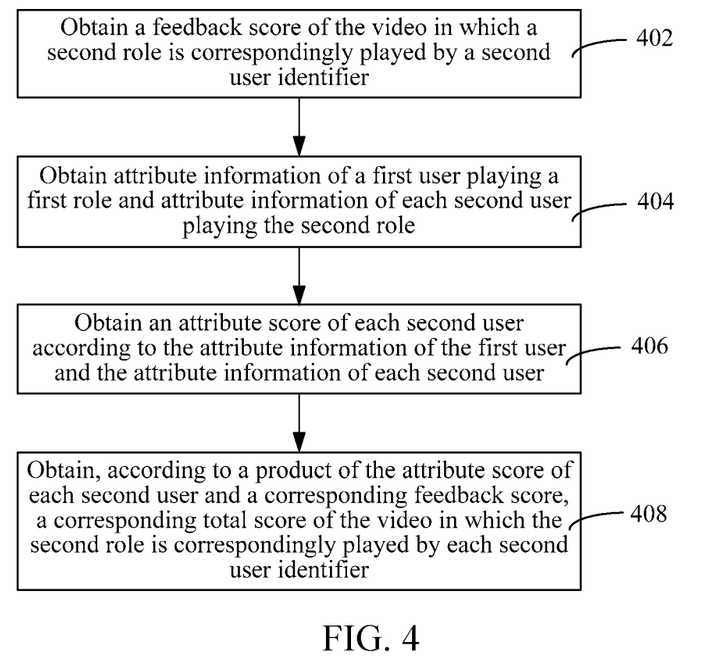
FIG. 4 is a specific flowchart of steps of obtaining a total score of videos in which the second role is correspondingly played by each second user identifier for each user type according to some embodiments of the present disclosure.

FIG. 4 is a specific flowchart of steps of obtaining a total score of videos in which the second role is correspondingly played by each second user identifier for each user type according to some embodiments of the present disclosure. As shown in FIG. 4, in an embodiment, the step of obtaining a total score of videos in which the second role is correspondingly played by each second user identifier for each user type includes:

Step 402: Obtain a feedback score of the video in which the second role is correspondingly played by the second user identifier.

In an embodiment, step 402 includes: obtaining a sum of basic scores of all videos including the video in which the second role is correspondingly played by the second user identifier, and using the sum of the basic scores as the feedback score of the video in which the second role is correspondingly played by the second user identifier.

In this embodiment, the feedback score of the video in which the second role is correspondingly played by the second user identifier, that is, the Feed score is equal to the sum of the basic scores of all videos including the video in which the second role is correspondingly played by the second user identifier. For example, when the video in which the second role is correspondingly played by the second user identifier is placed into two costarring videos, the Feed score is a sum of a basic score of the video in which the second role is correspondingly played by the second user identifier and basic scores of the two costarring videos.

For example, a video in which the second role is played by a friend B of a user A is C, and the video C is placed into a video costarred by a user D and a video costarred by a user E, a feedback score of the video C is a sum of a basic score of the video C, a basic score of the video including the video C and costarred by the user D and the user B, and a basic score of the video including the video C and costarred by the user E and the user B.

A basic score of a video is a sum of a play score and an interaction score. The play score is an evaluated score of determining the quality of a thumbnail in a video. The quality of a thumbnail is the quality of a video itself, such as clarity and distortion. The interaction score is an evaluated score of determining the quality of video content. The quality of video content indicates whether recorded video content is enjoyable, or the like.

Further, the step of obtaining a sum of basic scores of all videos including the video in which the second role is correspondingly played by the second user identifier includes: obtaining a play score and an interaction score of each video in which the second role is correspondingly played by the second user identifier, using a sum of the play score and the interaction score as a basic score of the video in which the second role is correspondingly played by the second user identifier, and then calculating a sum of all basic scores for videos in which the second role is correspondingly played by the second user identifier.

Further, the step of obtaining a play score and an interaction score of each video in which the second role is correspondingly played by the second user identifier includes:

obtaining play times, demonstration times, comment times, and like times of the video in which the second role is correspondingly played by the second user identifier;

obtaining, by multiplying a ratio of the play times to the demonstration times by a first coefficient factor, the play score of the video in which the second role is correspondingly played by the second user identifier; and obtaining a product of the comment times and a second coefficient factor and a product of the like times and a third coefficient factor, and then obtaining a ratio of a sum of the two products to the play times, to obtain the interaction score of the video in which the second role is correspondingly played by the second user identifier.

In this embodiment, the play times is times for which a video is played. The demonstration times is times for which a video is displayed. Play score=a1*play times/demonstration times. Interaction score=(comment times*a2+like times*a3)/play times.

The comment times is times for which another user performs commenting. The like times is times for which another user performs liking. a1 is the first coefficient factor, a2 is the second coefficient factor, and a3 is the third coefficient factor. a1, a2, and a3 are parameter information obtained by means of information statistics and may be adjusted. In this embodiment, a1 is 5.6, a2 is 128, and a3 is 46.1.

Step 404: Obtain attribute information of a first user playing the first role and attribute information of each second user playing the second role.

In this embodiment, both the attribute information of the first user and the attribute information of each second user may be one or more of age, geographical location, gender, graduate school, birthplace, workplace, or the like of the user.

Step 406: Obtain an attribute score of each second user according to the attribute information of the first user and the attribute information of each second user.

In this embodiment, a basic score of the attribute score of the second user is 1. When the attribute information of the first user and the attribute information of the second user satisfy a preset condition, the attribute score of the second user is increased by a corresponding attribute score. For example, when the second user and the first user have different genders, the attribute score of the second user is increased by a corresponding attribute factor b1; when the first user and the second user are in a same region, the attribute score of the second user is increased by a corresponding attribute score b2; when a difference between the age of the first user and the age of the second user is within a specified range, the attribute score of the second user is increased by a corresponding attribute score b3. In this embodiment, b1 may be 0.2, b2 may be 0.1, and b3 may be 0.2.

Step 408: Obtain, according to a product of the attribute score of each second user and a corresponding feedback score, the corresponding total score of the video in which the second role is correspondingly played by each second user identifier.

In this embodiment, the total score of the video cp in which the second role is correspondingly played by each second user identifier=attribute score of each second user*feedback score. cp is a set of video segments of a single role in a complete video.

Figure 5:
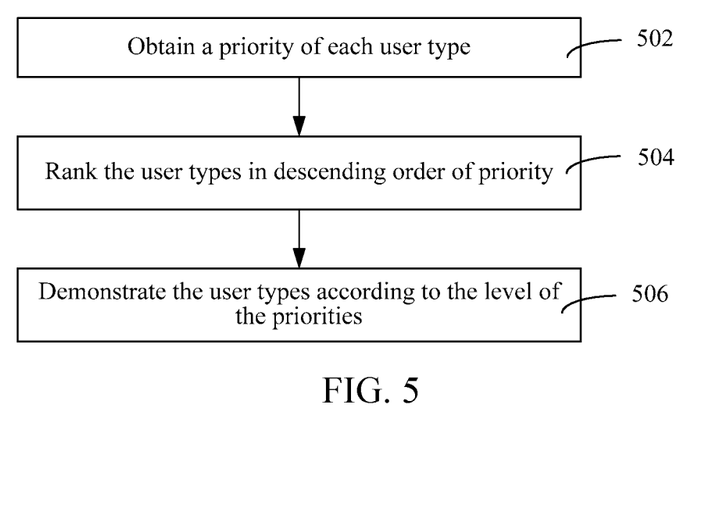
FIG. 5 is a flowchart of user type ranking according to some embodiments of the present disclosure.

As shown in FIG. 5, in an embodiment, the foregoing partner matching method in a costarring video further includes:

Step 502: Obtain a priority of each user type.

In this embodiment, the user type may include a first user type, a second user type, a third user type, a fourth user type, a fifth user type, and the like. Each user type has a priority. For example, it is set in such a manner that the priorities of the first user type, the second user type, the third user type, the fourth user type, and the fifth user type are in descending order.

Specifically, for example, the first user type is a star, the second user type is a friend of a user, the third user type is a person followed by a user, the fourth user type is an expert, and the fifth user type is a common user. Priorities of the star, the friend of a user, the person followed by a user, the expert and the common user are in descending order.

Step 504: Rank the user types in descending order of priority.

Step 506: Demonstrate the user types according to the level of the priorities.

According to the foregoing partner matching method in a costarring video, by setting the priorities for the user types, it is convenient to manage the user types according to the level of the priorities and recommend, according to the level of the priorities, a video in which the second role is played.

Further, in an embodiment, the foregoing partner matching method in a costarring video further includes: obtaining a maximum quantity of videos allowed to be demonstrated in each user type.

In this embodiment, the maximum quantity of videos allowed to be demonstrated is set for each user type. For example, the maximum quantity in the star type is 2, the maximum quantity in the user-friend type is 4, the maximum quantity in the type of a person followed by a user is 2, the maximum quantity in the expert type is 2, the maximum quantity in the common user type is 6, and the like. This is not limited thereto.

The step of respectively displaying a ranking result of the videos in which the second role is played for each user type includes:

when a quantity of videos in which the second role is played exceeds a corresponding maximum quantity in a user type, selecting, in descending order of total score of the videos in which the second role is played, videos of the maximum quantity for demonstration; or when a quantity of videos in which the second role is played does not exceed a corresponding maximum quantity in a user type, demonstrating all of the videos in which the second role is played in the user type.

In an embodiment, the foregoing partner matching method in a costarring video further includes: searching the first user type for a video in which the second role is played, to obtain n1 videos; if there are less than n1 videos, searching the second user type for a video in which the second role is played, to obtain n2 videos; if there are less than n2 videos, searching the third user type for a video in which the second role is played, to obtain n3 videos; if there are less than n3 videos, searching the fourth user type for a video in which the second role is played, to obtain n4 videos; if there are less than n4 videos, selecting a video whose total score is greater than a score threshold s from videos in which the second role is played in the fifth user type, to obtain n5 videos.

In this embodiment, n1, n2, n3, n4, n5, and s are set according to a requirement of a product, and may currently be 2, 6, 8, 10, 16, and 100. n1 is the maximum quantity allowed in the first user type. n2 is a sum of the maximum quantity allowed in the first user type and the maximum quantity allowed in the second user type. n3 is a sum of the maximum quantity allowed in the first user type, the maximum quantity allowed in the second user type, and the maximum quantity allowed in the third user type. n4 is a sum of the maximum quantity allowed in the first user type, the maximum quantity allowed in the second user type, the maximum quantity allowed in the third user type, and the maximum quantity allowed in the fourth user type. n5 is a sum of the maximum quantities allowed to be demonstrated in all of the user types.

In an embodiment, the step of synthesizing a complete video from the selected video in which the second role is played and the video in which the first role is played includes:

if a user type having a higher priority includes a video in which the second role is played, selecting a video whose total score is the highest and in which the second role is played from the user type having a higher priority, and using the selected video whose total score is the highest and in which the second role is played as a selected video in which the second role is played; or if a user type having a higher priority does not include a video in which the second role is played, selecting a video whose total score is the highest and in which the second role is played from a neighboring user type having a lower priority, and using the selected video whose total score is the highest and in which the second role is played as a selected video in which the second role is played.

For example, the first user type has a priority higher than that of the second user type, the first user type includes a video A1 and a video A2 in which the second role is played, the second user type includes a video B1 and a video B2 in which the second role is played, and a total score of the A1 is higher than a total score of the A2, and a total score of the B1 is higher than a total score of the B2. Regardless of the magnitude of the total scores of the B1 and the A1, the priorities of the user types are used as a reference first. Because the priority of the first user type is higher than that of the second user type, a video is selected from the first user type first. If the first user type includes a video in which the second role is played, the video A1 whose total score is the highest is selected from the first user type as a selected video in which the second role is played. The video is selected from the second user type only when the first user type does not include a video in which the second role is played.

In another embodiment, videos in which the second role is played in all user types may be ranked according to the magnitude of total scores, and then a video in which the second role is played and whose total score is the highest is recommended to the first user.

The following describes an implementation process of the partner matching method in a costarring video with reference to a specific application scenario. The user types include a star, a friend of a user, a person followed, an expert, and a common user. A maximum quantity allowed in the star type is 2, a maximum quantity allowed in the friend type is 4, a maximum quantity allowed in the person followed type is 2, a maximum quantity allowed in the expert type is 2, and a maximum quantity in the star type, the user-friend type, the person followed type, the expert type, and the common user type are increased to be 16. The implementation process includes:

(1) Obtaining a video recorded by a user and in which a first role is played and attribute information of the user that plays the first role.

(2) Obtaining videos in which the second role is played in the star type, the friend type, the person followed type, the expert type, and the common user type and attribute information of users that play the second role.

(3) Ranking, in descending order of total score, the videos in which the second role is played in each of the star type, the friend type, the person followed type, the expert type, and the common user type, to select an allowed maximum quantity of corresponding videos.

Total score of a video cp=Feed score*user attribute score. Feed score=a sum of basic scores of videos including the video cp. Basic score=play score+interaction score. Play score=5.6*play times/demonstration times. Interaction score=(comment times*128+like times*46.1)/play times. User attribute score=1+of opposite sex (+0.2)+in a same region (+0.1)+an age difference is within 3 years old (+0.2).

Figure 6:
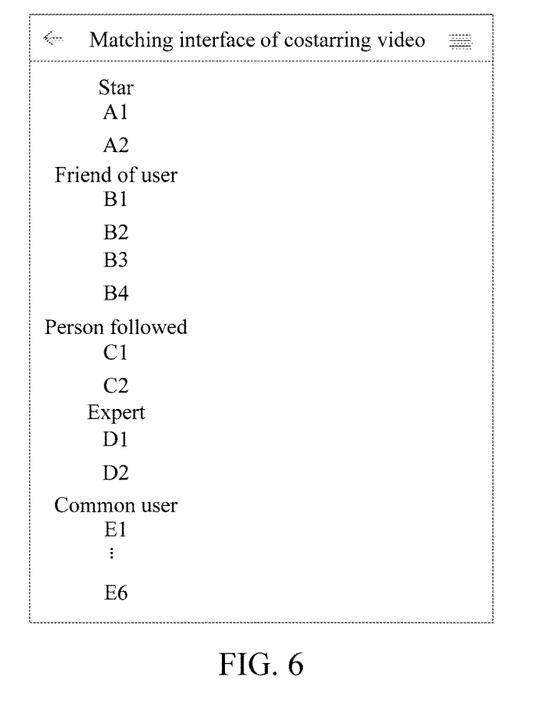
FIG. 6 is a schematic diagram of displaying a video to be recommended for a costarring video and in which a second role is played according to some embodiments of the present disclosure.

As shown in FIG. 6, videos in which the second role is played in the star type are A1 and A2, videos in which the second role is played in the friend type are B1, B2, B3, and B4, videos in which the second role is played in the person followed type are C1 and C2, videos in which the second role is played in the expert type are D1 and D2, and videos in which the second role is played in the common user type are E1 to E6.

Figure 7:
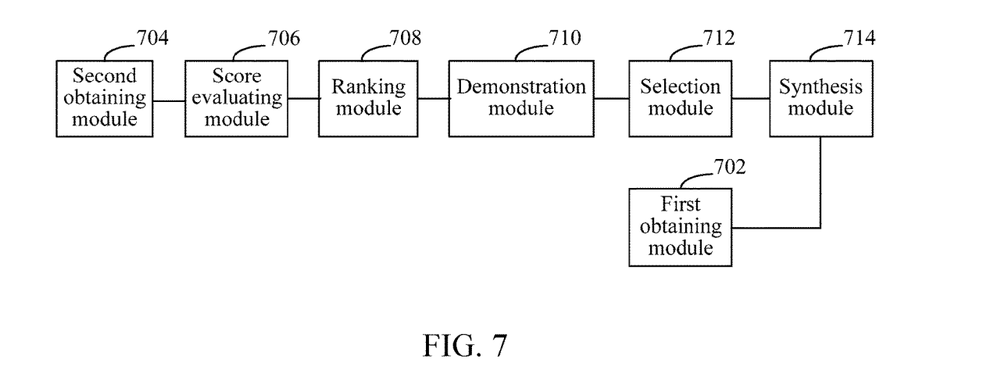
FIG. 7 is a structural block diagram of a partner matching apparatus in a costarring video according to some embodiments of the present disclosure.

FIG. 7 is a structural block diagram of a partner matching apparatus in a costarring video according to some embodiments of the present disclosure. As shown in FIG. 7, the partner matching apparatus in a costarring video includes: a first obtaining module 702, a second obtaining module 704, a score evaluating module 706, a ranking module 708, a demonstration module 710, a selection module 712, and a synthesis module 714.

The first obtaining module 702 is configured to obtain a video recorded by a first user identifier and in which a first role is played by the first user.

The second obtaining module 704 is configured to obtain a configured user type, a video in which a second role that matches the first role is played and a second user identifier that plays the second role in each user type.

In this embodiment, the user type may be configured according to a requirement. The user type may include a first user type, a second user type, a third user type, a fourth user type, a fifth user type, and the like, and is not limited thereto.

For example the user type may include a star, a friend of a user, a person followed by a user, an expert, a common user, or the like. A star is a person with a particular identity. A friend of a user is an instant communication friend or mobile contact friend, or the like. A person followed by a user is a person followed by the user in a social application program. An expert is a specialist or an outstanding person in a field. A common user is a user except a star, a friend of a user, a person followed by a user and an expert.

When a user type is obtained, a user list corresponding to the user type is obtained. In a user list of each user type, all user identifiers in the user type and videos in which the user identifiers play a role are recorded. A video in which the second role is played and a second user identifier are found in the user list.

The score evaluating module 706 is configured to obtain a total score of videos in which the second role is correspondingly played by each second user identifier for each user type.

In this embodiment, because one user type may include videos in which the second role is correspondingly played by one or more second user identifiers, a score of a video in which the second role is correspondingly played by each second user identifier is evaluated, to obtain a total score of the video in which the second role is correspondingly played by the second user identifier.

For example, the user type is a star. Both a star A and a star B played the second role. A video in which the second role is played by the star A and a video in which the second role is played by the star B are obtained, and a total score of the video in which the second role is played by the star A and a total score of the video in which the second role is played by the star B are evaluated.

The ranking module 708 is configured to rank, in descending order of total score, the videos in which the second role is correspondingly played by the second user identifiers for each user type.

In this embodiment, in each user type, the videos in which the second role is played are ranked in descending order of total score, that is, the videos in which the second role is played are ranked for each independent user type, and are not mixed with other user types. For example, a video in which the second role is played in the star type is not comparatively ranked with a video in which the second role is played in the user-friend type. In addition, the videos in which the second role is played for each user type may be ranked in ascending order of total score.

The demonstration module 710 is configured to respectively demonstrate a ranking result of the videos in which the second role is played for each user type.

The selection module 712 is configured to obtain a video selected from the ranking result and in which the second role is played.

In this embodiment, the video selected from the ranking result and in which the second role is played may be selected by the first user himself or by a system by default.

The synthesis module 714 is configured to synthesize a complete video from the selected video in which the second role is played and the video in which the first role is played.

According to the foregoing partner matching apparatus in a costarring video, the videos in which the second role that matches the first role is played for each user type are obtained, the videos are ranked according to the total scores, the ranking result is demonstrated, the video selected from the ranking result and in which the second role is played is obtained, and the complete video is synthesized from the video in which the first role is played and the video in which the second role is played. In this way, the video in which the second role is played is automatically obtained by matching according to the video in which the first role is played, and there is no need to wait for a user to actively play the second role, so that the efficiency of video synthesis is improved.

Figure 8:
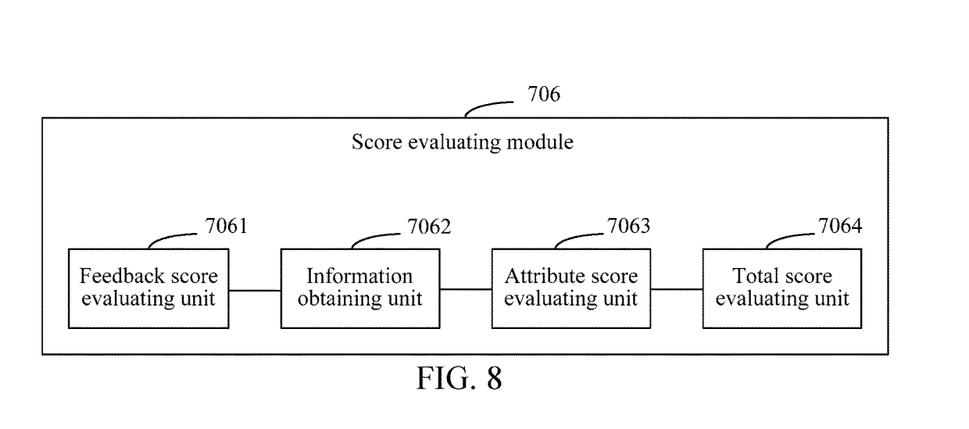
FIG. 8 is a block diagram of an inner structure of a score evaluating module according to some embodiments of the present disclosure.

FIG. 8 is a block diagram of an inner structure of a score evaluating module according to some embodiments of the present disclosure. As shown in FIG. 8, the score evaluating module 706 includes: a feedback score evaluating unit 7061, an information obtaining unit 7062, an attribute score evaluating unit 7063, and a total score evaluating unit 7064.

The feedback score evaluating unit 7061 is configured to obtain a feedback score of the video in which the second role is correspondingly played by the second user identifier.

In this embodiment, the feedback score of the video in which the second role is correspondingly played by the second user identifier, that is, the Feed score=a sum of basic scores of all videos including the video in which the second role is correspondingly played by the second user identifier. For example, when the video in which the second role is correspondingly played by the second user identifier is placed into two costarring videos, the Feed score is a sum of a basic score of the video in which the second role is correspondingly played by the second user identifier and basic scores of the two costarring videos.

For example, a video in which the second role is played by a friend B of a user A is C, and the video C is placed into a video costarred by a user D and a video costarred by a user E, a feedback score of the video C is a sum of a basic score of the video C, a basic score of the video including the video C and costarred by the user D and the user B, and a basic score of the video including the video C and costarred by the user D and the user B.

A basic score of a video is a sum of a play score and an interaction score. The play score is an evaluated score of determining the quality of a thumbnail in a video. The quality of a thumbnail is the quality of a video itself, such as clarity and distortion. The interaction score is an evaluated score of determining the quality of video content. The quality of video content indicates whether recorded video content is enjoyable, or the like.

The information obtaining unit 7062 is configured to obtain attribute information of a first user playing the first role and attribute information of each second user playing the second role.

The attribute score evaluating unit 7063 is configured to obtain an attribute score of each second user according to the attribute information of the first user and the attribute information of each second user.

The total score evaluating unit 7064 is configured to obtain, according to a product of the attribute score of each second user and a corresponding feedback score, the corresponding total score of the video in which the second role is correspondingly played by each second user identifier.

Further, the feedback score evaluating unit 7061 is further configured to: obtain a sum of basic scores of all videos including the video in which the second role is correspondingly played by the second user identifier, and use the sum of the basic scores as the feedback score of the video in which the second role is correspondingly played by the second user identifier.

The feedback score evaluating unit 7061 is further configured to: obtain a play score and an interaction score of each video in which the second role is correspondingly played by the second user identifier, use a sum of the play score and the interaction score as a basic score of the video in which the second role is correspondingly played by the second user identifier, and then calculate a sum of all basic scores.

The feedback score evaluating unit 7061 is further configured to: obtain play times, demonstration times, comment times, and like times of the video in which the second role is correspondingly played by the second user identifier;

obtain, by multiplying a ratio of the play times to the demonstration times by a first coefficient factor, the play score of the video in which the second role is correspondingly played by the second user identifier; and obtain a product of the comment times and a second coefficient factor and a product of the like times and a third coefficient factor, and then obtain a ratio of a sum of the two products to the play times, to obtain the interaction score of the video in which the second role is correspondingly played by the second user identifier.

Figure 9:
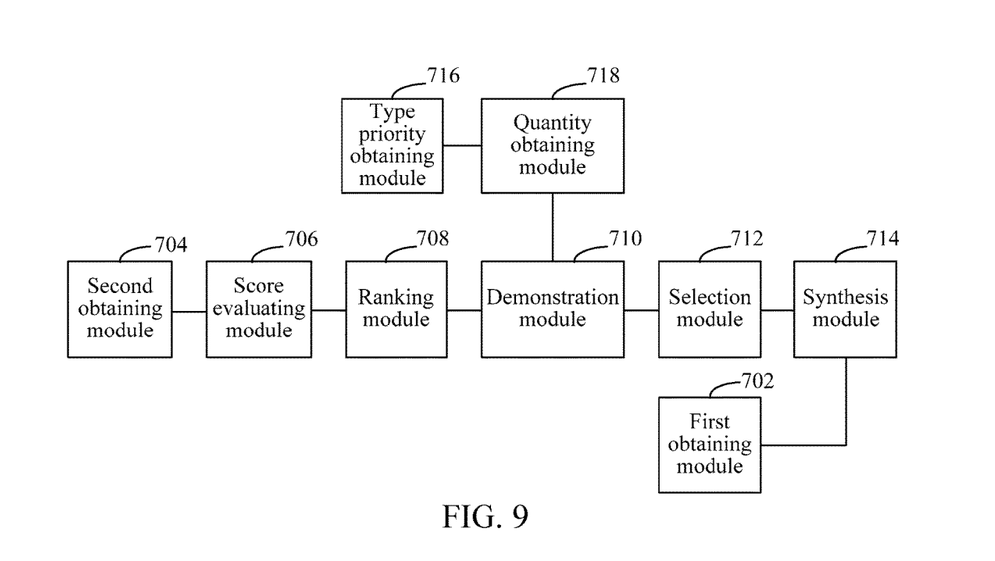
FIG. 9 is a structural block diagram of a partner matching apparatus in a costarring video according to another embodiment of the present disclosure.

FIG. 9 is a structural block diagram of a partner matching apparatus in a costarring video according to another embodiment. As shown in FIG. 9, the partner matching apparatus in a costarring video includes a type priority obtaining module 716 and a quantity obtaining module 718 in addition to a first obtaining module 702, a second obtaining module 704, a score evaluating module 706, a ranking module 708, a demonstration module 710, a selection module 712, and a synthesis module 714.

The type priority obtaining module 716 is configured to obtain a priority of each user type.

The ranking module 708 is further configured to rank the user types in descending order of priority.

The demonstration module 710 is further configured to demonstrate the user types according to the level of the priorities.

The quantity obtaining module 718 is configured to obtain a maximum quantity of videos allowed to be demonstrated in each user type.

The demonstration module 710 is further configured to: when a quantity of videos in which the second role is played exceeds a corresponding maximum quantity in a user type, select, in descending order of total score of the videos in which the second role is played, videos of the maximum quantity for demonstration; or when a quantity of videos in which the second role is played does not exceed a corresponding maximum quantity in a user type, demonstrate all of the videos in which the second role is played in the user type.

The selection module 712 is further configured to: if a user type having a higher priority includes a video in which the second role is played, select a video whose total score is the highest and in which the second role is played from the user type having a higher priority, and use the selected video whose total score is the highest and in which the second role is played as a selected video in which the second role is played; or if a user type having a higher priority does not include a video in which the second role is played, select a video whose total score is the highest and in which the second role is played from a neighboring user type having a lower priority, and use the selected video whose total score is the highest and in which the second role is played as a selected video in which the second role is played.

A person of ordinary skill in the art may understand that all or some of the procedures of the methods in the foregoing embodiments may be implemented by a computer program instructing relevant hardware. The program may be stored in a non-volatile computer readable storage medium. When the program runs, the procedures of the foregoing methods in the embodiments may be performed. The storage medium may be a magnetic disc, an optical disc, a read-only memory (ROM), or the like.

The foregoing embodiments only show several implementations of the present disclosure and are described in detail, but they should not be construed as a limit to the patent scope of the present disclosure. It should be noted that, a person of ordinary skill in the art may make various changes and improvements without departing from the ideas of the present disclosure, which shall fall within the protection scope of the present disclosure. Therefore, the protection scope of the patent of the present disclosure shall be subject to the claims.

What is claimed is:

1. A partner matching method in a costarring video performed by a terminal having one or more processors and memory storing a plurality of programs to be executed by the one or more processors, the method comprising:
    obtaining a video recorded by a first user identifier and in which a first role is played by the first user;
    obtaining a configured user type, a video in which a second role that matches the first role is played and a second user identifier that plays the second role in each user type;
    obtaining a total score of videos in which the second role is correspondingly played by each second user identifier for each user type;
    ranking, in descending order of total score, the videos in which the second role is correspondingly played by the second user identifiers for each user type;
    respectively displaying a ranking result of the videos in which the second role is played for each user type;
    obtaining a video selected from the ranking result and in which the second role is played; and
    synthesizing a complete video from the selected video in which the second role is played and the video in which the first role is played.

2. The method according to claim 1, wherein the obtaining a total score of videos in which the second role is correspondingly played by each second user identifier for each user type comprises:
    obtaining a feedback score of the video in which the second role is correspondingly played by the second user identifier;
    obtaining attribute information of a first user playing the first role and attribute information of each second user playing the second role;
    obtaining an attribute score of each second user according to the attribute information of the first user and the attribute information of each second user; and
    obtaining, according to a product of the attribute score of each second user and a corresponding feedback score, the corresponding total score of the video in which the second role is correspondingly played by each second user identifier.

3. The method according to claim 2, wherein the obtaining a feedback score of the video in which the second role is correspondingly played by the second user identifier comprises:
    obtaining a sum of basic scores of all videos comprising the video in which the second role is correspondingly played by the second user identifier, and using the sum of the basic scores as the feedback score of the video in which the second role is correspondingly played by the second user identifier.

4. The method according to claim 3, wherein the obtaining a sum of basic scores of all videos comprising the video in which the second role is correspondingly played by the second user identifier comprises:
    obtaining a play score and an interaction score of each video in which the second role is correspondingly played by the second user identifier, using a sum of the play score and the interaction score as a basic score of the video in which the second role is correspondingly played by the second user identifier, and then calculating a sum of all basic scores for videos in which the second role is correspondingly played by the second user identifier.

5. The method according to claim 4, wherein the obtaining a play score and an interaction score of each video in which the second role is correspondingly played by the second user identifier comprises:
    obtaining play times, demonstration times, comment times, and like times of the video in which the second role is correspondingly played by the second user identifier;
    obtaining, by multiplying a ratio of the play times to the demonstration times by a first coefficient factor, the play score of the video in which the second role is correspondingly played by the second user identifier; and
    obtaining a product of the comment times and a second coefficient factor and a product of the like times and a third coefficient factor, and then obtaining a ratio of a sum of the two products to the play times, to obtain the interaction score of the video in which the second role is correspondingly played by the second user identifier.

6. The method according to claim 1, further comprising:
    obtaining a priority of each user type;
    ranking the user types in descending order of priority; and
    demonstrating the user types according to the level of the priorities.

7. The method according to claim 6, further comprising:
    obtaining a maximum quantity of videos allowed to be demonstrated in each user type, wherein
    the respectively displaying a ranking result of the videos in which the second role is played for each user type comprises:

when a quantity of videos in which the second role is played exceeds a corresponding maximum quantity in a user type, selecting, in descending order of total score of the videos in which the second role is played, videos of the maximum quantity for demonstration; or when a quantity of videos in which the second role is played does not exceed a corresponding maximum quantity in a user type, demonstrating all of the videos in which the second role is played in the user type.

8. The method according to claim 6, wherein the synthesizing a complete video from the selected video in which the second role is played and the video in which the first role is played comprises:

if a user type having a higher priority comprises a video in which the second role is played, selecting a video whose total score is the highest and in which the second role is played from the user type having a higher priority, and using the selected video whose total score is the highest and in which the second role is played as a selected video in which the second role is played; and if a user type having a higher priority does not comprise a video in which the second role is played, selecting a video whose total score is the highest and in which the second role is played from a neighboring user type having a lower priority, and using the selected video whose total score is the highest and in which the second role is played as a selected video in which the second role is played.

9. A terminal comprising one or more processors, memory coupled to the one or more processors, and a plurality of programs stored in the memory that, when executed by the one or more processors, cause the terminal to perform operations including:

obtaining a video recorded by a first user identifier and in which a first role is played by the first user;

obtaining a configured user type, a video in which a second role that matches the first role is played and a second user identifier that plays the second role in each user type;

obtaining a total score of videos in which the second role is correspondingly played by each second user identifier for each user type;

ranking, in descending order of total score, the videos in which the second role is correspondingly played by the second user identifiers for each user type;

respectively displaying a ranking result of the videos in which the second role is played for each user type;

obtaining a video selected from the ranking result and in which the second role is played; and synthesizing a complete video from the selected video in which the second role is played and the video in which the first role is played.

10. The terminal according to claim 9, wherein the obtaining a total score of videos in which the second role is correspondingly played by each second user identifier for each user type comprises:

obtaining a feedback score of the video in which the second role is correspondingly played by the second user identifier;

obtaining attribute information of a first user playing the first role and attribute information of each second user playing the second role;

obtaining an attribute score of each second user according to the attribute information of the first user and the attribute information of each second user; and obtaining, according to a product of the attribute score of each second user and a corresponding feedback score, the corresponding total score of the video in which the second role is correspondingly played by each second user identifier.

11. The terminal according to claim 10, wherein the obtaining a feedback score of the video in which the second role is correspondingly played by the second user identifier comprises:

obtaining a sum of basic scores of all videos comprising the video in which the second role is correspondingly played by the second user identifier, and using the sum of the basic scores as the feedback score of the video in which the second role is correspondingly played by the second user identifier.

12. The terminal according to claim 11, wherein the obtaining a sum of basic scores of all videos comprising the video in which the second role is correspondingly played by the second user identifier comprises:

obtaining a play score and an interaction score of each video in which the second role is correspondingly played by the second user identifier, using a sum of the play score and the interaction score as a basic score of the video in which the second role is correspondingly played by the second user identifier, and then calculating a sum of all basic scores for videos in which the second role is correspondingly played by the second user identifier.

13. The terminal according to claim 12, wherein the obtaining a play score and an interaction score of each video in which the second role is correspondingly played by the second user identifier comprises:

obtaining play times, demonstration times, comment times, and like times of the video in which the second role is correspondingly played by the second user identifier;

obtaining, by multiplying a ratio of the play times to the demonstration times by a first coefficient factor, the play score of the video in which the second role is correspondingly played by the second user identifier; and obtaining a product of the comment times and a second coefficient factor and a product of the like times and a third coefficient factor, and then obtaining a ratio of a sum of the two products to the play times, to obtain the interaction score of the video in which the second role is correspondingly played by the second user identifier.

14. The terminal according to claim 9, wherein the operations further comprise:

obtaining a priority of each user type;

ranking the user types in descending order of priority; and demonstrating the user types according to the level of the priorities.

15. The terminal according to claim 14, wherein the operations further comprise:

obtaining a maximum quantity of videos allowed to be demonstrated in each user type, wherein the respectively displaying a ranking result of the videos in which the second role is played for each user type comprises:

when a quantity of videos in which the second role is played exceeds a corresponding maximum quantity in a user type, selecting, in descending order of total score of the videos in which the second role is played, videos of the maximum quantity for demonstration; or when a quantity of videos in which the second role is played does not exceed a corresponding maximum quantity in a user type, demonstrating all of the videos in which the second role is played in the user type.

16. The terminal according to claim 14, wherein the synthesizing a complete video from the selected video in which the second role is played and the video in which the first role is played comprises:
if a user type having a higher priority comprises a video in which the second role is played, selecting a video whose total score is the highest and in which the second role is played from the user type having a higher priority, and using the selected video whose total score is the highest and in which the second role is played as a selected video in which the second role is played; and
if a user type having a higher priority does not comprise a video in which the second role is played, selecting a video whose total score is the highest and in which the second role is played from a neighboring user type having a lower priority, and using the selected video whose total score is the highest and in which the second role is played as a selected video in which the second role is played.

17. A non-transitory computer readable storage medium storing a plurality of programs for partner matching in a costarring video, wherein the plurality of programs, when executed by one or more processors of a terminal, cause the terminal to:
obtain a video recorded by a first user identifier and in which a first role is played by the first user;
obtain a configured user type, a video in which a second role that matches the first role is played and a second user identifier that plays the second role in each user type;
obtain a total score of videos in which the second role is correspondingly played by each second user identifier for each user type;
rank, in descending order of total score, the videos in which the second role is correspondingly played by the second user identifiers for each user type;
respectively display a ranking result of the videos in which the second role is played for each user type;
obtain a video selected from the ranking result and in which the second role is played; and
synthesize a complete video from the selected video in which the second role is played and the video in which the first role is played.

18. The non-transitory computer readable storage medium according to claim 17, wherein the terminal is further configured to:
obtain a feedback score of the video in which the second role is correspondingly played by the second user identifier;
obtain attribute information of a first user playing the first role and attribute information of each second user playing the second role;
obtain an attribute score of each second user according to the attribute information of the first user and the attribute information of each second user; and
obtain, according to a product of the attribute score of each second user and a corresponding feedback score, the corresponding total score of the video in which the second role is correspondingly played by each second user identifier.

19. The non-transitory computer readable storage medium according to claim 18, wherein the terminal is further configured to:
obtain a sum of basic scores of all videos comprising the video in which the second role is correspondingly played by the second user identifier; and
use the sum of the basic scores as the feedback score of the video in which the second role is correspondingly played by the second user identifier.

20. The non-transitory computer readable storage medium according to claim 19, wherein the terminal is further configured to:
obtain a play score and an interaction score of each video in which the second role is correspondingly played by the second user identifier;
use a sum of the play score and the interaction score as a basic score of the video in which the second role is correspondingly played by the second user identifier; and
calculate a sum of all basic scores for videos in which the second role is correspondingly played by the second user identifier.

* * * * *